United States Patent

Platter et al.

[11] Patent Number: 5,580,447
[45] Date of Patent: Dec. 3, 1996

[54] BIOCIDE FILTER

[75] Inventors: Sanford Platter; Jeffrey K. Aldred, both of Boulder; Kraig J. Koski, Lafayette; Louis H. Junker; Eric M. Reynolds, both of Boulder, Colo.

[73] Assignee: Sweetwater, Inc., Longmont, Colo.

[21] Appl. No.: 286,639

[22] Filed: Aug. 5, 1994

Related U.S. Application Data

[63] Continuation-in-part of Ser. No. 990,526, Dec. 15, 1992, Pat. No. 5,366,642, which is a continuation-in-part of Ser. No. 682,650, Apr. 9, 1991, Pat. No. 5,433,848.

[51] Int. Cl.$^6$ .............. B01D 35/26; C02F 1/50; C02F 1/76
[52] U.S. Cl. .............. 210/206; 210/266; 210/282; 210/416.3
[58] Field of Search ............... 210/266, 282, 210/206, 209, 199, 767, 416.3, 416.1, 416.2, 416.3, 416.4, 416.5, 232, 237, 238, 541, 542

[56] References Cited

U.S. PATENT DOCUMENTS

| | | | |
|---|---|---|---|
| 417,070 | 12/1889 | Morris | 210/285 |
| 1,090,283 | 3/1914 | Crandall | 210/285 |
| 1,521,100 | 12/1924 | House | 210/285 |
| 2,434,958 | 1/1948 | Quinn | 210/232 |
| 3,923,665 | 12/1975 | Lambert et al. | 210/501 |
| 4,212,743 | 7/1980 | Van Meter et al. | 210/282 |
| 4,298,475 | 11/1981 | Gartner | 210/266 |
| 4,305,782 | 12/1981 | Ostreicher et al. | 210/503 |
| 4,366,068 | 12/1982 | Ostreicher et al. | 210/767 |
| 4,420,590 | 12/1983 | Gartner | 525/357 |
| 4,769,143 | 9/1988 | Deutsch et al. | 210/266 |
| 4,828,698 | 5/1989 | Jewell et al. | 210/282 |
| 4,859,340 | 8/1989 | Hou et al. | 210/502.1 |
| 4,995,976 | 2/1991 | Vermes et al. | 210/282 |
| 4,999,190 | 3/1991 | Fina et al. | 424/79 |
| 5,017,286 | 5/1991 | Heiligmon | 210/266 |
| 5,061,367 | 10/1991 | Hatch et al. | 210/137 |
| 5,076,922 | 12/1991 | DeAre | 210/282 |
| 5,106,500 | 4/1992 | Hembree et al. | 210/266 |
| 5,110,479 | 5/1992 | Frommer et al. | 210/282 |
| 5,126,044 | 6/1992 | Magnusson et al. | 210/282 |
| 5,156,737 | 10/1992 | Iana et al. | 210/266 |
| 5,173,192 | 12/1992 | Shalev | 210/282 |
| 5,230,624 | 7/1993 | Wolf et al. | 433/82 |
| 5,256,287 | 10/1993 | Underwood | 210/282 |
| 5,268,093 | 12/1993 | Hembree et al. | 210/282 |
| 5,269,919 | 12/1993 | von Medlin | 210/256 |
| 5,273,649 | 12/1993 | Magnusson et al. | 210/232 |
| 5,273,650 | 12/1993 | Vermes et al. | 210/282 |
| 5,277,802 | 1/1994 | Goodwin | 210/286 |
| 5,290,457 | 3/1994 | Karbachsch et al. | 210/282 |
| 5,308,482 | 5/1994 | Mead | 210/207 |
| 5,328,609 | 7/1994 | Magnusson et al. | 210/314 |
| 5,362,385 | 11/1994 | Klegerman et al. | 210/416.3 |
| 5,366,642 | 11/1994 | Platter et al. | 210/767 |
| 5,385,667 | 1/1995 | Steger | 210/266 |
| 5,401,399 | 3/1995 | Magnusson et al. | 210/282 |
| 5,407,573 | 4/1995 | Hughes | 210/266 |
| 5,415,770 | 5/1995 | Heskett | 210/266 |
| 5,415,774 | 5/1995 | Cowan et al. | 210/283 |
| 5,431,816 | 7/1995 | Aldred et al. | 210/460 |
| 5,433,848 | 7/1995 | Platter et al. | 210/238 |

FOREIGN PATENT DOCUMENTS

WO91/15281   10/1991   WIPO .............. B01D 24/08

*Primary Examiner*—Cynthia L. Nessler
*Attorney, Agent, or Firm*—Duft, Graziano & Forest, P.C.

[57] ABSTRACT

An efficient, low pressure drop biocide cartridge is provided for destroying viral and bacterial pathogens in water from untreated water sources along a lengthened flow pathway including a critical plenum for controlling the speed of water throughput. In a first pathway, water is percolated through a turbulatable bed of biocidally-effective material. In flow pathway, channeling and pressure drop are reduced by radial flow across a columnar bed presenting a large surface area at an outer diameter. The cartridge may be connected with a lightweight hand-held pump. A sealing strap is provided for wet storage of any biocide cartridge.

12 Claims, 9 Drawing Sheets

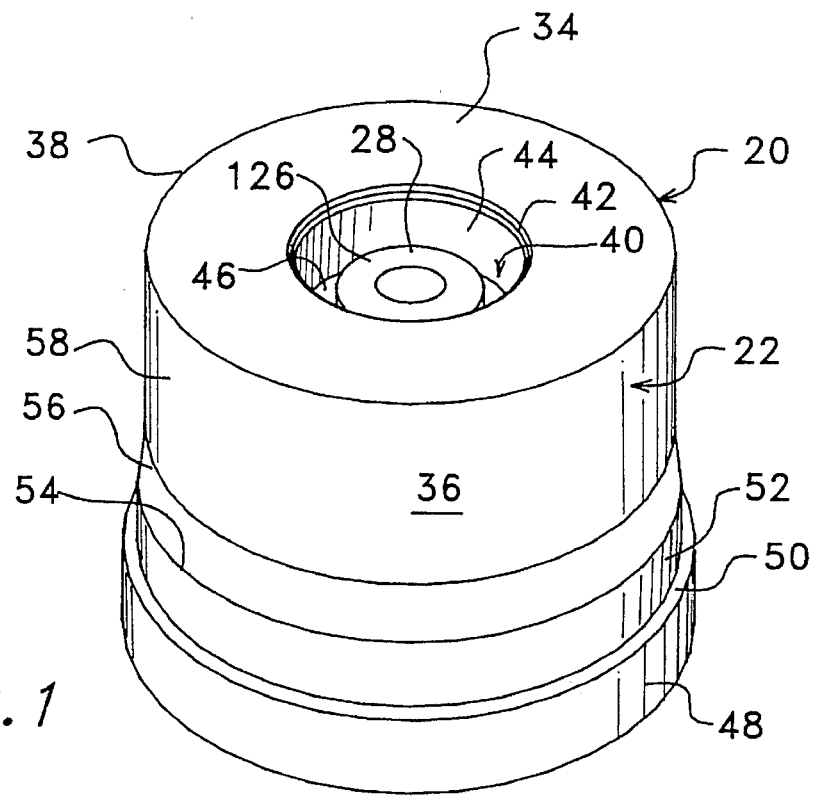
FIG. 1
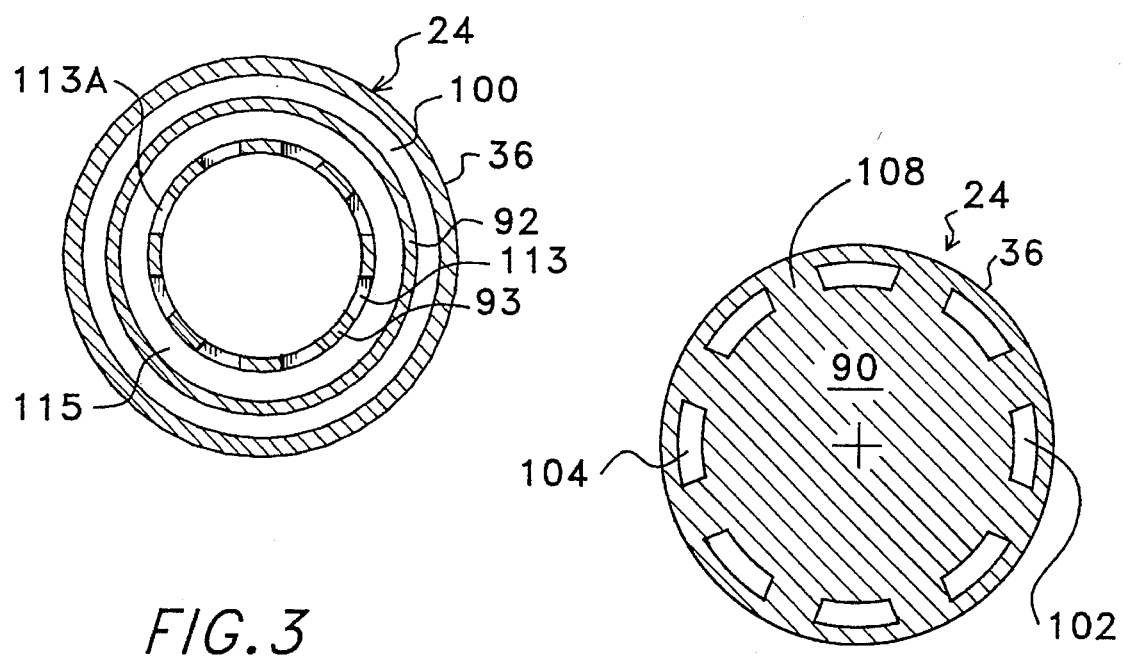
FIG. 3
FIG. 4

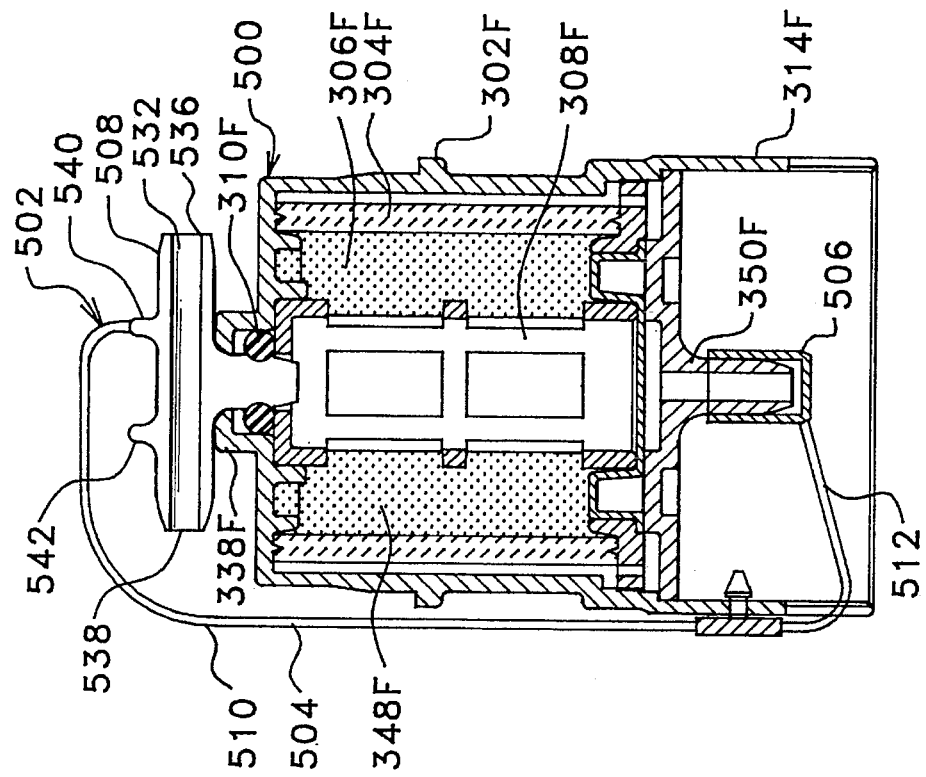
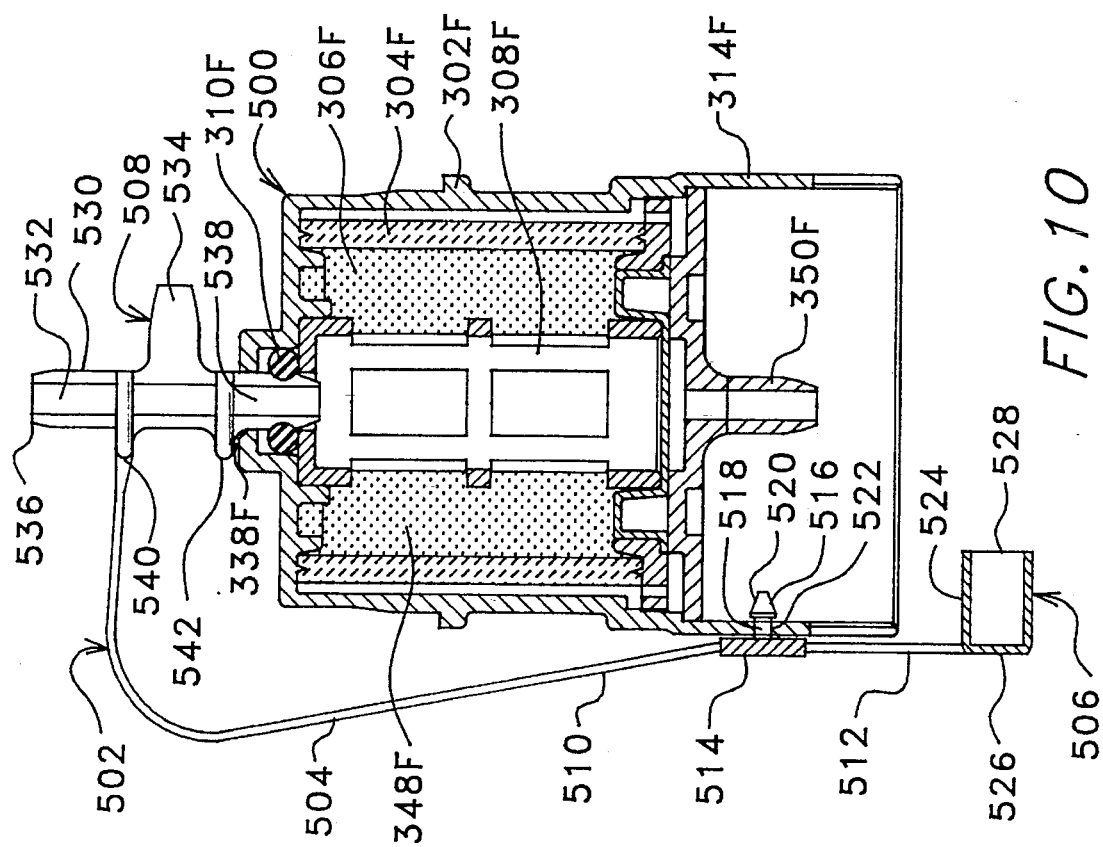

BIOCIDE FILTER

RELATED APPLICATIONS

This application is a continuation-in-part of application Ser. No. 07/990,526, filed on Dec. 15, 1992, now U.S. Pat. No. 5,366,642 which is a continuation-in-part of application Ser. No. 07/682,650, filed on Apr. 9, 1991 now U.S. Pat. No. 5,433,848.

BACKGROUND OF THE INVENTION

1. Field of the Invention

The present invention pertains to the field of devices and methods that may be utilized in treating liquids for the removal of contaminants such as pathogens, and, more particularly, to portable biocide filters used to destroy bacterial and viral pathogens during the production of potable water.

2. Statement of the Problem

Hand-held water purification devices have been developed, primarily, for the benefit of travellers who are confronted with available water supplies of poor and dangerous quality. In many underdeveloped countries, the public water supply is not potable, and can carry severe or even life-threatening diseases, such as typhoid, cholera, hepatitis, and dysentery. Even pristine wilderness areas have water supplies that are increasingly contaminated with a variety of particulate matter including, insects, nematodes, fungi, algae, yeasts, and pathogenic microorganisms.

There are many pathogens in potential sources of drinking water, such as protozoa that can be removed by filtration. Bacteria can also be removed by proper filtration; however, filtering bacteria is difficult with a portable water filter. Viruses are extremely difficult to remove from drinking water by filtration, and it is impractical to filter viruses in a portable or hand-held water filter. Viral pathogens can be responsible for such diseases as hepatitis, poliomyelitis, and gastroenteritis or diarrhea derived from rotavirus. In use, the ultrafiltration devices that are required for the removal of viruses are often associated with vexatious clogging problems.

Hembree et al, U.S. Pat. No. 5,106,500, discloses a hand-held water filtration pump including a porous body of biocide formed of water-soluble halogenated anion-exchange resins. Water is first filtered through a mechanical filter, then forced under pressure through the porous biocide.

Hembree et al, U.S. Pat. No. 5,268,093, discloses a water filtration pump having a biocide-containing canister positioned to receive water from a mechanical filter. A chemical scavenging material may be positioned to receive water discharged from the biocide filter for the removal of chemicals from the water.

The prior hand-held biocide pump-filters are associated with critical difficulties pertaining to pressure drop across the biocide bed. A significant pressure drop occurs as the untreated water is passed through the packed bed of biocide material. This pressure drop demands the exertion of wearisome manual forces on the pump handle, and produces corresponding wear in the pump components.

Prior devices utilize relatively dense or impermeable biocide resin beds to increase surface area contact with the water and to prolong transit time through the bed for purposes of increasing dissolved biocide levels to effective amounts. Unfortunately, in use, the treatment process is often short-circuited by channeling and compaction of the biocide filter-bed material due to flow rates in excess of design limits on behalf of impatient users. These problems have burdened the prior types of biocide filter devices with bad reputations for difficulty in use and limited effectiveness against pathogens.

Despite prior efforts to develop a workable hand-held water purification apparatus for treating polluted water, there remains a heartfelt need to produce a compact, easy to use, effective device.

SOLUTION TO THE PROBLEM

The present invention overcomes the problems that are outlined above by providing a compact, low hydraulic resistance biocide cartridge for effectively destroying viral and bacterial pathogens in polluted water.

Broadly speaking, the invention includes a cartridge containing a biocide for treating water. More specifically, the cartridge includes a water-receiving body having marginal wall structure forming an interior cavity or flow pathway communicating an inlet at an upstream flow position and an outlet at a downstream flow position. The flow pathway retains a bed of treating agent material that serves to contact any water flowing through the pathway. The treating agent material contains treating agent, such as a water-soluble biocide, that is soluble in the water. The treating agent material is present in an effective amount for treating the water for the destruction of water-born bacterial or viral pathogens. The cartridge is also provided with a screen element for retaining substantially all of the treating agent material within the cavity when the treating agent material is in an undissolved state, and a mechanical filter having microfiltration-sized openings for removing particulate matter from the incoming water. The mechanical filter will preferably serve to remove particles ranging from a low size of 0.3 microns in diameter to a large size of about five microns in diameter.

Preferred embodiments of the invention include the cartridge flow pathway having a flow-governing assembly, such as a multi-ported manifold adjacent the inlet in fluidic communication with a plurality of fluidically interconnected downstream chambers. A significant feature of the most preferred flow-governing assembly is the provision of a critical plenum, i.e., a system flow node providing special flow characteristics. The crossectional area of this plenum is large enough to make the pneumatic resistance small as compared to the pneumatic resistance of the overall flow system, but large enough so that, at the flow rates used, the gravity forces on the flowing fluid will not cause the fluid to collect at the bottom of the inlet filter. The collection of fluid at the bottom of the filter would tend to cause fluid to cross only the bottom portion of the filter element and a corresponding proximal portion of the biocide bed, with a resultant high pneumatic resistance and a poor efficiency in use of the biocide material. This arrangement serves to provide a substantially uniform net fluid speed in the entry area, the inlet side of the biocide bed, and through the biocide bed.

The critical plenum is preferably formed upstream of the treating agent material as an annulus intermediate two opposed concentric tubular walls. One of the walls is preferably provided with a permeable face, such as a mechanical filter, while the other wall is essentially impermeable. The plenum serves to restrict flow through the annular chamber in a direction parallel to an axis of symmetry in the tubular walls prior to passage of the fluid across the permeable wall in a direction transverse to the axis of symmetry. The dimensions of the preferred plenum satisfy the equation $$C1=|(0.3*L_f*Q)/(v*\Delta D*D_f)|, \text{ wherein} \tag{1}$$

C1 is an absolute-value dimensionless constant ranging from about 500 to about 1500;

v is the fluid kinematic viscosity, i.e., apparent viscosity divided by density in units of length squared over time;

$L_f$ is the axial mechanical filter length;

Q is the average fluid flow rate;

$\Delta D$ is $D_f$- D;

$D_f$ is the mechanical filter diameter at the side adjacent the annulus; and

D is the plenum diameter at the wall opposed from the mechanical filter.

Of course, those skilled in the art will understand that equation (1) may be mathematically modified to suit other flow geometries.

The treating agent preferably includes an ionic exchange resin capable of destroying the viral and bacterial pathogens within the water. The destruction of viral and bacterial pathogens, alone, will not insure that water treated by the cartridge is safe for consumption. Larger pathogens, e.g., protozoa such as Giardia and Cryptosporidium, are preferably removed by filtration.

The ionic exchange resin preferably includes at least one ionic halogen fraction selected from the group consisting of fluorine, chlorine, iodine, and bromine, as well as a halogen carrier, such as a quaternary amine, that retards the halogen solubility in water. The halogen fraction most preferably includes a mixture of iodine ions having a variety of valence states. The treating agent may also include a substrate, such as a polystyrene substrate, for retaining the halogen and the carrier at a given minimum size. Whether a carrier is used or not, the treating agent particles will most preferably have a size distribution bounded by standard deviation limits within a range from about 10 microns to about 1000 microns. Preferred beds are formed of granules including a mixture of particle sizes because the smaller particles tend to occupy interstitial spaces between the larger particles, thus, increasing surface area contact with water passing through the biocide bed.

Additional preferred embodiments include the flow-governing assembly having a positively charged mesh or matrix for inducing a slippage velocity of negatively charged particles within the water. This slippage velocity is determined relative to an average speed of water flow across the positively charged mesh. The matrix is positioned downstream of the treating agent material for permitting the slippage velocity to prolong a halogen-contact time of the particles within the cavity as the negatively charged viral particles are attracted to and decelerated by the positively charged matrix.

The preferred cartridges also have a detachable coupling mechanism that facilitates rapid, contamination-free coupling and decoupling of a biocide cartridge with a hand-held pumping system. The coupling mechanism includes the cartridge water inlet having a male protrusion and the outlet having a protrusion-receiving female opening that, if desired, may be sized to receive a corresponding male protrusion on the pumping system. In even more preferred embodiments, the male protrusion is concentrically received within a tubular member and coextends with a portion of the tubular member towards an outer end of the tubular member over a distance less than that to the outer end of the tubular member. Similarly, the pumping system itself may have an inner male member that is protected from contamination by an outer concentric tubular member.

In a first preferred embodiment, a portion of the cavity is loosely packed with a granular treating agent material to form a turbulatable bed of the material. In this embodiment, the portion of the flow pathway that travels across the treating agent bed is more preferably longer in the direction of flow than it is wide across the direction of flow. The treating agent is preferably placed within a series of interconnected concentric annular chambers formed between concentric walls. The annular chambers are fed through a ported disk member to provide a substantially uniform water flow speed distribution into the cavity across the permeable face of the treating agent bed. The ported disk is fed through the filter outlet side of an annular plenum chamber as described above. The interconnected chambers provide a lengthened flow pathway that serves to increase the degree of contact between the water and the treating agent bed across which the water flows. This lengthened pathway provides a more effective manner of using a given amount of biocide than is provided by prior compacted beds, i.e., a relatively greater speed of water may be effectively treated by a given weight or volume of biocide treating agent material due to the elongated flowpath. Despite the lengthened nature of the pathway, a low hydraulic resistance is provided therein by the loosely packed turbulatable bed.

The turbulatable bed of treating agent material is formed by pouring granular treating agent material into the cavity to a fill level beneath a volumetric capacity of the cavity. This incomplete level of fill permits turbulent motion of the treating agent material when the water is flowing through the cavity. This fill level normally occupies from about 50% to about 90% of the cavity volume, more preferably about 70% to about 80% of this volume.

In a second preferred embodiment, the flow-governing system includes the treating agent material densely packed into a tubular column having an inner diameter at an inner surface and an outer diameter at an outer surface. The flow pathway runs across the treating agent bed from the outer surface to the inner surface, or vice-versa. A line of symmetry may be drawn along the longitudinal axis of the elongated columnar bed, and the flow-governing assembly preferably causes the water to cross the bed along a flow pathway having a transverse angular orientation, and more preferably a substantially normal orientation, with respect to this line of symmetry. Thus, while the net flow across the cartridge occurs along the line of symmetry, the bed-treatment occurs in a radial direction normal to the line of symmetry. Again, a critical plenum that is formed between two concentric walls provides system flow constraints. In this case, the critical plenum is formed as annular space between an outer tubular wall and an interior tubular mechanical filter surrounding the outer diameter surface of the columnar treating agent bed.

The cartridge flow pathway may be connected in succession with other treatment compartments. For example, an activated carbon canister may be positioned downstream of the biocide cartridge, as a polisher to remove both the biocide and other chemicals from the final water product.

The cartridge is preferably coupled with a water source for use. This water source may be pressurized, such as a conventional water faucet connected to a well or municipal water supply, but is more preferably a lightweight hand-held pump. A positive pressure water source may be connected to the inlet side for normal use or to the outlet side for backflushing of the cartridge. A negative pressure water source, such as the inlet of a hand-held pump, is connected to the outlet side of the biocide cartridge.

Especially preferred embodiments include a sealing plug assembly for sealing water within the biocide cartridge when the cartridge is stored during periods of nonuse. This sealing assembly includes a backflush adapter having a plug for sealing one of the inlet and the outlet of the cartridge, and a tubular member adapted to be received within the outlet for backflushing of the cartridge. The sealing assembly includes a central connective clip member, an inlet sealing element having dimensions complimentary to the cartridge inlet for detachable sealing engagement therewith against leakage of water from within the biocide-containing compartment, an outlet sealing element having dimensions complimentary to the outlet for detachable sealing engagement therewith against leakage of water from within the biocide-containing compartment. The most preferred sealing assembly includes a strap for connecting the inlet sealing element and the outlet sealing element with the clip member. Thus, the sealing elements and the backflush adaptor are attached to the biocide cartridge and will not be misplaced or lost.

The present invention is thus able to provide a compact, efficient, effective low pressure biocide filter capable of purifying untreated water sources by destroying or removing chemicals, bacteria, and virus from contaminated water. These and other features will be evident from the ensuing description of a preferred embodiment and from the drawings.

BRIEF DESCRIPTION OF THE DRAWINGS

FIG. 1 depicts a top perspective view of a first embodiment of a biocide cartridge of the present invention;

FIG. 3 depicts a cross-sectional view taken along line 3'—3' of FIG. 2, and illustrates a flow governing assembly formed of the concentric tubular members;

FIG. 4 depicts a cross-sectional view taken along line 4'—4' of FIG. 2 and illustrates a flow-governing assembly having a plurality of radially oriented fluid ports that discharge into the elongated fluid pathway;

FIG. 10 depicts an elevational midsectional side view of a fifth embodiment of the invention, which is like that of the FIG. 7 embodiment, but additionally has a strap attached thereto for use in backflushing the cartridge and sealing water inside the cartridge for storage thereof;

FIG. 11 depicts an elevational midsectional side view of the cartridge of the FIG. 10 embodiment having the strap attached in a cartridge-sealing position.

DETAILED DESCRIPTION OF THE PREFERRED EMBODIMENTS

Figure 2:
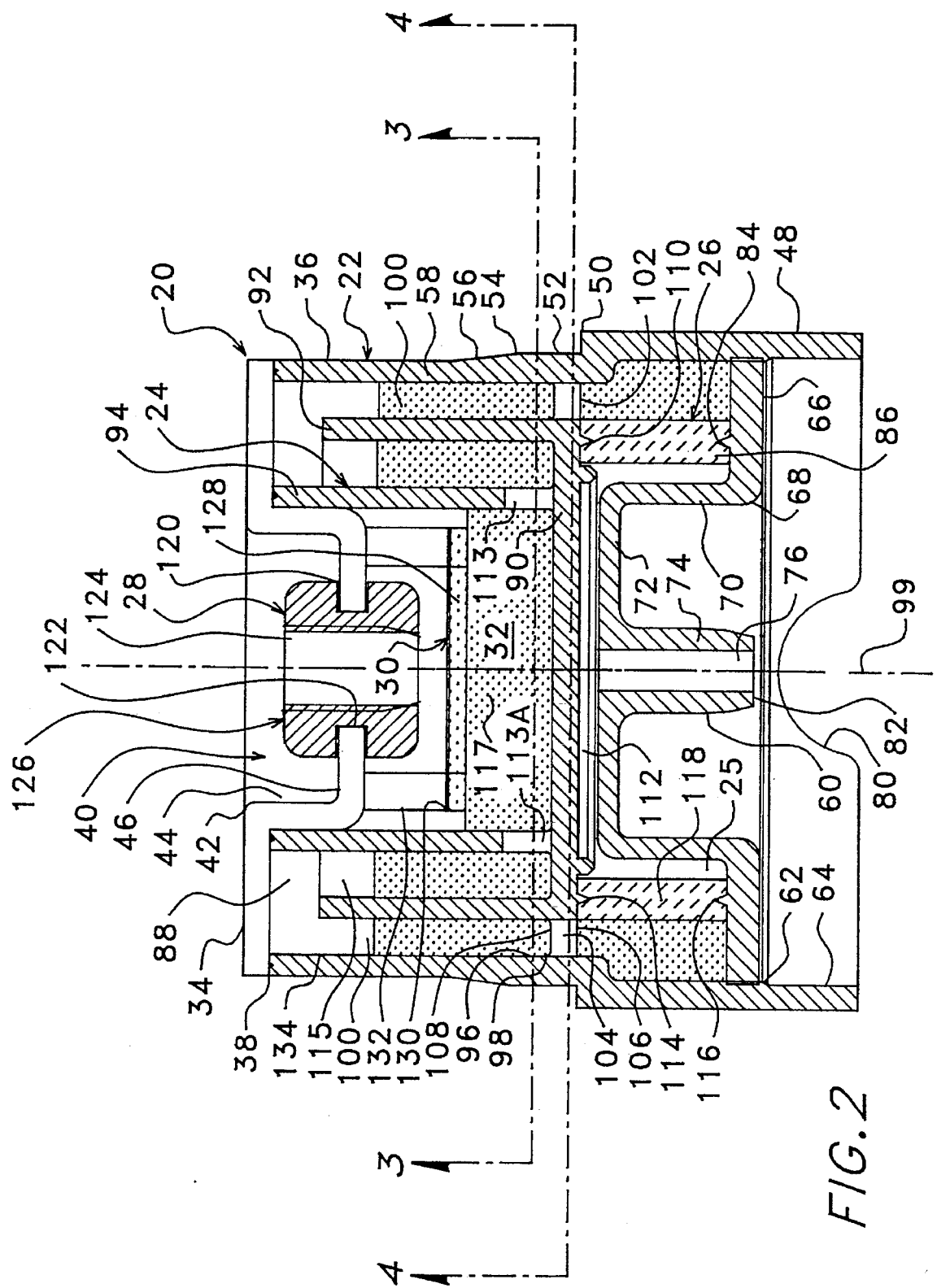
FIG. 2 depicts a vertical side cutaway view of the FIG. 1 embodiment, wherein a turbulatable bed of treating agent material is retained within an elongated flow pathway existing between a series of fluidically interconnected concentric tubular members.

FIG. 2 depicts a midsectional view of a first embodiment of the present invention, biocide cartridge 20, which incorporates an interior turbulatable bed of treating agent material. More specifically, the major components of biocide cartridge 20 include marginal wall structure 22, tubular flow-governing assembly 24 including critical plenum 25, tubular mechanical filter 26, elastomeric gasket 28, outlet screen disk assembly 30, and halogenated biocide bed 32. With the exception of bed 32 and filter 26, as will be explained below, these components are preferably formed of a synthetic resin that will not react with the chemicals in the biocidal agent, such as polypropylene, polyethylene, or ABS plastic.

FIG. 1 depicts a front exterior perspective view of biocide cartridge 20, which emphasizes exterior features of marginal wall structure 22. Wall structure 22 includes a disk-shaped flat top or outlet member 34, which meets cylindrical outer wall 36 at a right angle. Top 34 and wall 36 are preferably integrally formed at circumferential margin 38, but may also be ultrasonically welded or chemically bonded. Top 34 travels inwardly from outer margin 38 towards a central recessed outlet portion 40 having upper bevel 42 at a junction with vertical wall 44. In turn, wall 44 meets inwardly with apertured horizontal bottom planar outlet face 46. Vertical wall 36 has circumferential bottom lip 48, which rises to a reduced diameter at inward shoulder 50 where it is ultrasonically welded to vertical tubular section 52. Vertical section 52 rises from shoulder 50 towards line 54, and, thereafter, tapers upwardly to an even lesser diameter at line 56. Cylindrical section 58 rises upwardly at constant diameter from line 56 to join top 34.

As can now be observed from FIG. 2, wall structure 22 also includes bottom or inlet member 60. Outlet member 60 is joined at circumferential edge 62 with interior face 64 of lip 48, preferably, with an interference fit and coupled by an ultrasonic weld or chemical bond. Member 60 presents a planar, horizontal bottom disk 66, which travels inwardly from circumferential edge 62 to form inlet recess 68 at vertical inlet wall 70. Wall 70 rises to an uppermost limit at horizontal inlet face 72, which travels inwardly towards an elongated cylindrical male inlet protrusion 74 having inlet opening 76. Note that lip 48 is preferably provided with arcuate lower marginal recess 80, which rises to a level just beneath a lowermost extreme 82 of protrusion 74. Uppermost face 84 of disk 66 carries a vertically oriented circular knife-edge abutment 86. Cavity 88 is bounded by the interior portions of top 34, bottom 60, and sidewall 36.

Flow-governing assembly 24 includes critical plenum 25, ported disk element 90, a first inner tubular wall 92, and a second inner tubular wall 94. Ported disk element 90 is joined with interior face 96 of wall 36 at circumferential edge 98, preferably, by way of an interference fit, but may also be joined by way of an ultrasonic weld or chemical bonding.

FIG. 2 depicts critical plenum 25 as an annular chamber formed between the impermeable vertical inlet wall 70 and the inlet side of tubular mechanical filter 26. The change in diameter that occurs across plenum 25 in a direction radially outward from axis of symmetry 99 between the radially outward surface of wall 70 and the radially inward side of filter 26 is governed by equation (1) as recited above. This change in diameter will typically range from about 0.25 to about 2.0 millimeters for flow speeds of about 1 liter per minute where the filter has a diameter ranging from about 25 millimeters to about 40 millimeters and a length ranging from about 12 millimeters to about 50 millimeters.

As depicted in FIGS. 2, 3, and 4, ported disk element 90 is integrally formed with upright first inner tubular wall 92 which rises to a point beneath top 34. Wall 92 has an outer diameter sufficient to form radial annular chamber 100 between wall 36 and first inner tubular wall 92. Disk 90 includes a plurality of ports, e.g., ports 102 and 104, which communicate between outer disk face 106 and inner disk face 108 (see port 104). Outer disk face 106 has a downwardly extending, circular knife-edge protrusion 110.

Second inner tubular wall 94 is joined with ported disk member 90 and top 34, extending downwardly a sufficient distance to raise member 90 above bottom member 60 to provide space 112 for communication between inlet opening 76 and critical plenum 25. Wall 92 permits water overflow, at its uppermost extremity, from annular chamber 100, and is provided with a plurality of lower portion ducts, e.g., ducts 113 and 113A, establishing fluidic communication across wall 94 between second radial annular chamber 115 and into central chamber 117.

Tubular mechanical filter 26 is preferably a fibrous labyrinth depth filter having pore openings that will effectively remove particulate matter from incoming water. This particulate matter may include sediments and some microorganisms, but the preferred filter will not remove viruses. The preferred filter is capable of removing particles having effective diameters ranging from about 0.3 micron to about 5 microns. In low-sediment environments of use, a particle filter capable of removing 0.3 micron particles will remove substantially all bacterial contaminants, but this size of filter will clog quickly in moderately sedimented environments and may require the use of a pre-filter (not depicted) upstream of the cartridge inlet 76 or repeated backflushing to remove the particle filter-cake over the effective life of cartridge 20. A one micron filter will serve to remove substantially all protozoa and will not clog as easily as the 0.3 micron filter. A 5 micron filter will remove only sediments and will require the subsequent filtration of protozoa at a position downstream of outlet 60, because protozoa are typically not destroyed by the halogen concentrations obtainable from the preferred materials constituting biocide bed 32. It is preferred that the particle throughput is less than about 5 microns for continued effective removal of water-born contaminants.

Filter 26 is restrained from movement relative to other components of cartridge 20 by abutment 86 and protrusion 110, which are received in grooves at the corresponding upper extremity 114 and lower extremity 116 of filter 26. Filter 26 presents an outer filter face 118, which divides cavity 88 into an inlet side proximal to face 118 and an outlet side remote from face 118.

Tubular rubber gasket 28 is received within a central aperture 120 in outlet face 46. Gasket 28 includes an outer perimeter having circumferential groove 122 that compressively engages face 46, as well as a central outlet opening 124 in fluidic communication with cavity 88. As depicted in FIGS. 1 and 2, gasket 28 includes an uppermost extremity 126 that rises to a height beneath that of top disk 34.

Outlet screen disk assembly 30 includes a lowermost horizontal perforated disk element 128 joined at its outer radial margin to imperforate vertical tubular wall 132. Wall 132 is joined to outlet face or plate 46. Perforated disk element 128 has perforations sized to retain the treating agent material 32 within cavity 88. These perforations preferably have diameters ranging from about 10 microns to about 1000 microns, depending upon the particle size distribution of the treating agent material forming bed 32.

Biocide bed 32 is a granular treating agent material, preferably having a grain size distribution including particle diameters ranging from about 10 to about 1000 microns. This treating agent is preferably a halogenated biocide material of limited water solubility, such as may be obtained as a variety of commercially available ionic exchange resins. The treating agent material more preferably includes a sized substrate, such as polystyrene beads, having an exterior surface coated with a combination of a quaternary amine and the halogen. By way of example, this type of material may be purchased from Water Technology Corporation of Minneapolis, Minn. as PENTAPURE[1] iodinated resin. These types of commercially available resins should be used for biocidal efficacy under conditions according to the manufacturer's instructions. The preferred iodinated resins will provide a residual iodine ion concentration (determined as $I_2$) ranging from about 0.5 ppm to about 5 ppm in water leaving cartridge 20 over the effective life of cartridge 20.

[1] PENTAPURE is a trademark of Water Technology Corporation of Minneapolis, Minn.

The specific quantity of treating agent material that is used in bed 32 will vary in proportion to flow speed and the total amount of water to be treated before the resin is exhausted. The treating agent should be present in an effective amount for treating the water by destroying a substantial portion of the viral and bacterial pathogens therein. The halogen is most preferably comprised of iodine ions in a variety of valence states, but may also be selected from the group consisting of fluorine, chlorine, iodine, and bromine.

The treating agent material preferably has a density that will permit water moving through bed 32 to turbulate the same. The turbulatable bed concept is made possible by loosely packing cavity 88 with the material of bed 32 to a fill level 134 occupying from 50% to 90% and more preferably from about 70% to about 80% of the volume of cavity 88 between filter 26 and screen outlet disk 128.

Figure 5:
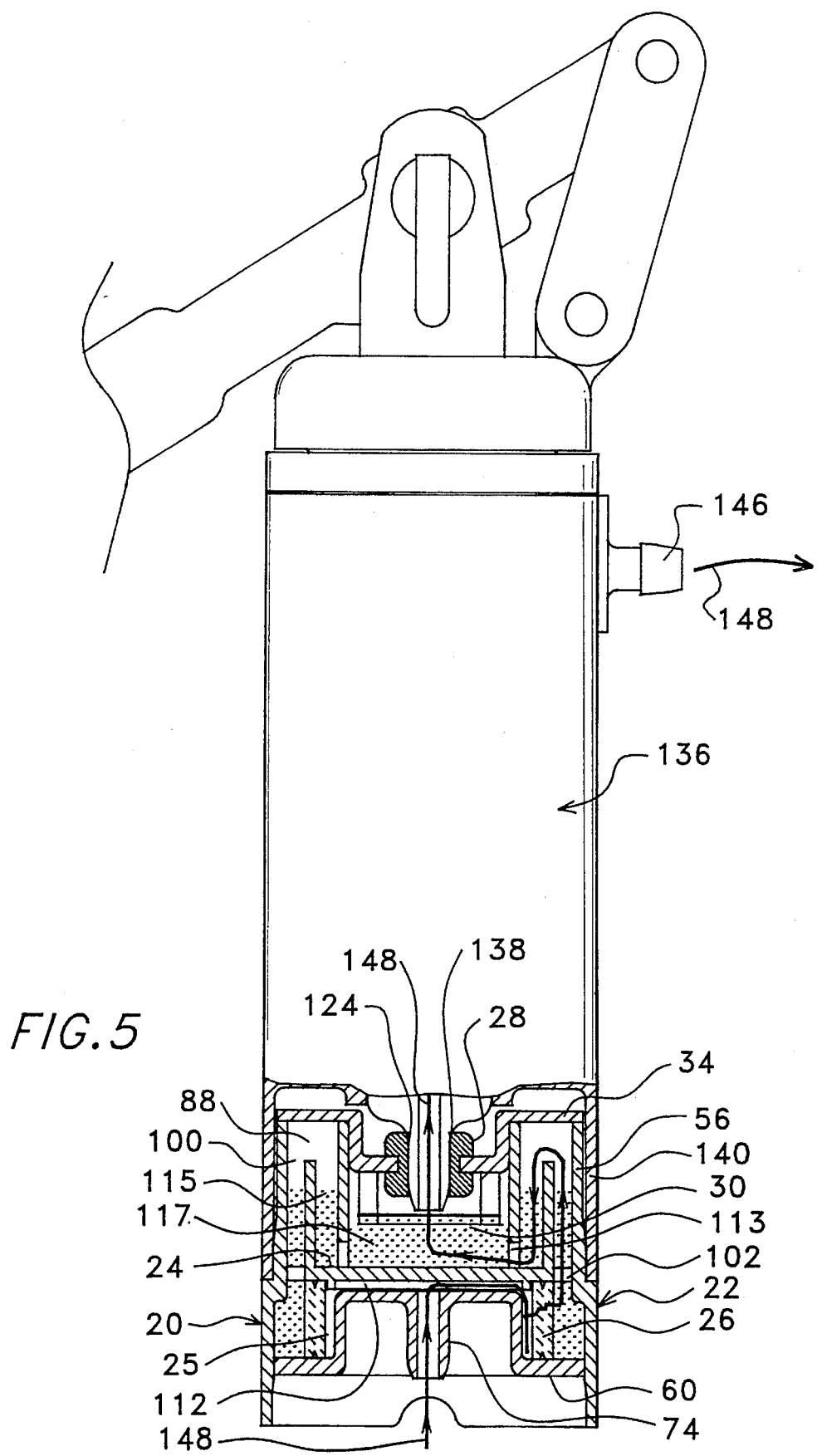
FIG. 5 depicts a partial cutaway of the FIG. 1 cartridge attached to a hand-held filter pump.

FIG. 5 depicts cartridge 20 attached to a hand-held pump 136, which is preferably of a handle-actuated type described in application Ser. No. 07/990,526, assigned to the present assignee and hereby incorporated by reference herein. Pump 136 includes a male suction intake 138, which is received within female gasket 28 to form a watertight seal. Lower tubular pump wall 140 compressively engages taper 56 to form a detachable water-tight seal. Suction intake 138 is in fluidic communication with interior pump mechanism (not depicted) in a manner that forces water from suction intake 138 and thorough purified water outlet 146.

Accordingly, it is seen that a radial flow pathway 148 exists through cartridge 20 from an upstream position at inlet protrusion 74 to a downstream position at outlet 124. More specifically, pathway 148 enters cartridge through inlet protrusion 74, crosses space 112 into plenum 25, passes across filter 26, turns 90° to rise through port 102 into first radial annular chamber 100, crosses 180° into and travels downwardly through second radial annular chamber 115, turns 90° through duct 113 into central chamber 117, rises past screen disk member 30, through outlet 124, and into pump 136. This lengthened path, and particularly the angular bend portion of path 148 within biocide bed 32, is preferably about two to three times as long as it is wide, i.e., the length of the path is greater than the radius of ported disk 90. The sizing of plenum 25 according to equation (1) serves to provide a substantially uniform volumetric flow speed of water across the entire filtration surface area of filter 26.

The effective length of the lengthened flow path 148, as described above, ensures sufficient mixing of the water with the ionic resin particles for solubilizing sufficient halogen ions to destroy viral and bacterial pathogens in the water being treated. The term "lengthened flow path" is hereby defined to include a water conduit having a successive plurality of bends. The use of interconnected annular chambers 100 and 115 to create a series of flow path portions ensures proper mixing while minimizing the pressure drop within the filter. Pressure drop is also minimized by the use of a turbulatable uncompacted biocide bed 32 having a correspondingly reduced pressure drop, as compared to prior compacted-bed designs.

In use, pump 136 is actuated to draw contaminated water into suction intake 138 through cartridge 20. The water source may be any lake, stream, puddle, or city water supply. Water enters cartridge 20 through inlet 74, and, thereafter, travels along pathway 148. Filter element 26 serves to remove particulates from the water, and even pathogenic microorganisms; however, small virus, possibly bacteria, and chemical contaminants may still cross filter 26 with the water into cavity 88. Within cavity 88, the water releases halogen ions from the amine and substrate, thus, introducing a halogen ion biocide concentration into the water in a concentration sufficient to destroy the virus. The halogen solubilization and pathogen destruction are enhanced by turbulent mixing of the particulate resin with the water traveling along partially filled radial annular chambers 100 and 115. This mixing serves to increase the halogen content of the water, as well as to destroy additional virus, not only by the increased halogen concentration, but also by direct contact between the virus and the resin particles. Furthermore, the turbulent mixing precludes formation of water channels through bed 32, as the turbulated material resettles in a uniform manner at intervals of no flow, and is constantly randomized during positive flow intervals.

The halogenated water exits cartridge 20 into pump suction intake 138, and then passes into the interior of pump 136 where the water is actuated for passage through pump outlet 146. A residual halogen content will remain in the treated water, and this residual concentration will continue to destroy any remaining viral and bacterial pathogens as the water is allowed to sit for a period of halogen contact time prior to consumption.

A pre-filter assembly (not depicted) may be attached to inlet protrusion 74 to prevent undue clogging of filter 26. This pre-filter assembly includes a flexible hose having a first end coupled with a sediment filter and a second end sized to be received over protrusion 74. The flexible hose may also be provided with an adjustable sliding float (not depicted) to hold the prefilter at a prescribed depth for water intake.

In the event that filter 26 prematurely clogs, cartridge 20 may be detached by pulling it apart from pump 136, and reattached by coupling the pump outlet 146 with a backflush adaptor which is connected with cartridge outlet 124 as discussed below. In this configuration, filtered water may be cycled through pump 136 to backflush cartridge 20, thereby removing excess sediment from filter 26 and biocide bed 32. In the detached configuration, cartridge 20 may be placed on any hard surface without fear of contaminating either gasket 28 or inlet 74 through contact with the hard surface. This benefit derives from the fact that gasket 28 and inlet protrusion 74 are recessed with respect to the outermost surfaces of wall structure 22.

Certain environmental conditions are hostile to water purification by halogenated ion exchange resins. These conditions include low temperatures, abnormally high or low pH values, and water that contains an extremely high degree of particulate matter. In these circumstances, it is recommended to filter the water twice by passing it through the biocide cartridge, and to let the twice-filtered product reside in a receiving container for several minutes of halogen contact time before the water is consumed.

Cartridge 20 is utilized according to a method including the steps of filtering particulate matter to provide desedimented water at biocide bed 32; and treating the desedimented water to destroy viral and bacterial pathogens by flowing the water through a bed 32 of treating agent material retained along a flow-governing pathway 148 having a succession of radial annular chambers 100 and 115.

Figure 6:
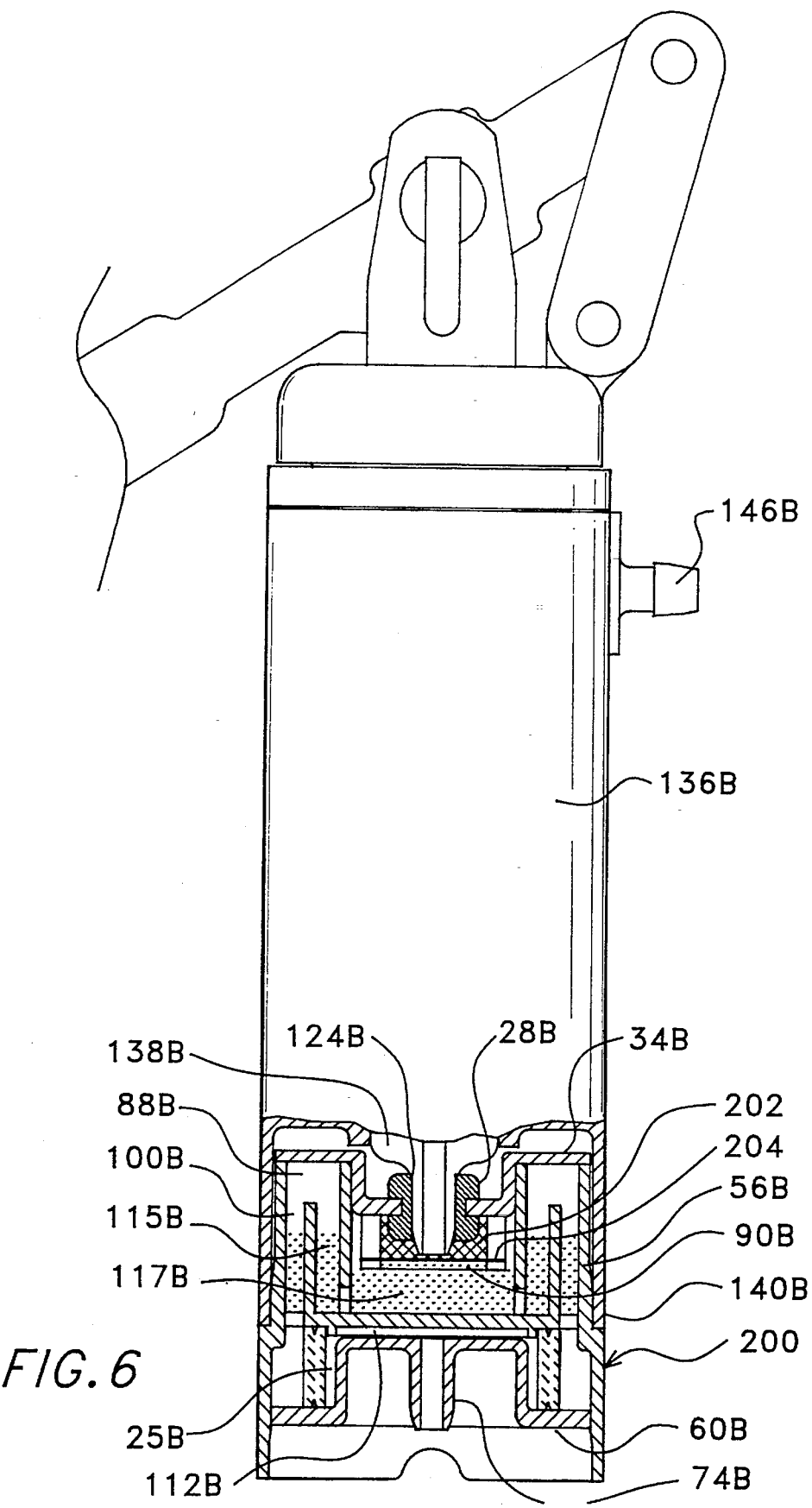
FIG. 6 depicts a second embodiment of the present invention, like that of FIG. 1, but additionally including a positively charged matrix just prior to the cartridge outlet.

FIG. 6 depicts a second embodiment of the present invention, second biocide cartridge 200, wherein identical features with respect to the FIG. 1 embodiment are provided with like numbering followed by the addition of the postscript "B." In fact, second cartridge 200 is identical to cartridge 20, except for the addition a positively charged matrix 202, which is received within space 204 in a downstream position with respect to perforated disk element 90B. The positively-charged matrix is a water-permeable fine mesh, such as a fiberglass screen having a bound ionic coating that exerts a virus-attracting positive charge. This positive charge serves to retain negatively charged particles, i.e., virus, in the halogenated water exiting cavity 88B, thereby inducing a slippage velocity of the viral particles relative to the water velocity. This charge-repulsion mechanism increases the reaction time of the virus within cavity 88B, and enhances the efficacy of the applied biocide. A suitable matrix 202 can be formed from a fibrous fiberglass mesh or fiberglass wool preferably having openings of effective diameter ranging from about 10 microns to about 500 microns. The fiberglass mat is provided with a quaternary amine coating to establish the positive charge. This second cartridge 200 is used in the same manner as cartridge 20, but has an enhanced level of viral destruction efficacy due to matrix 202.

Figure 7:
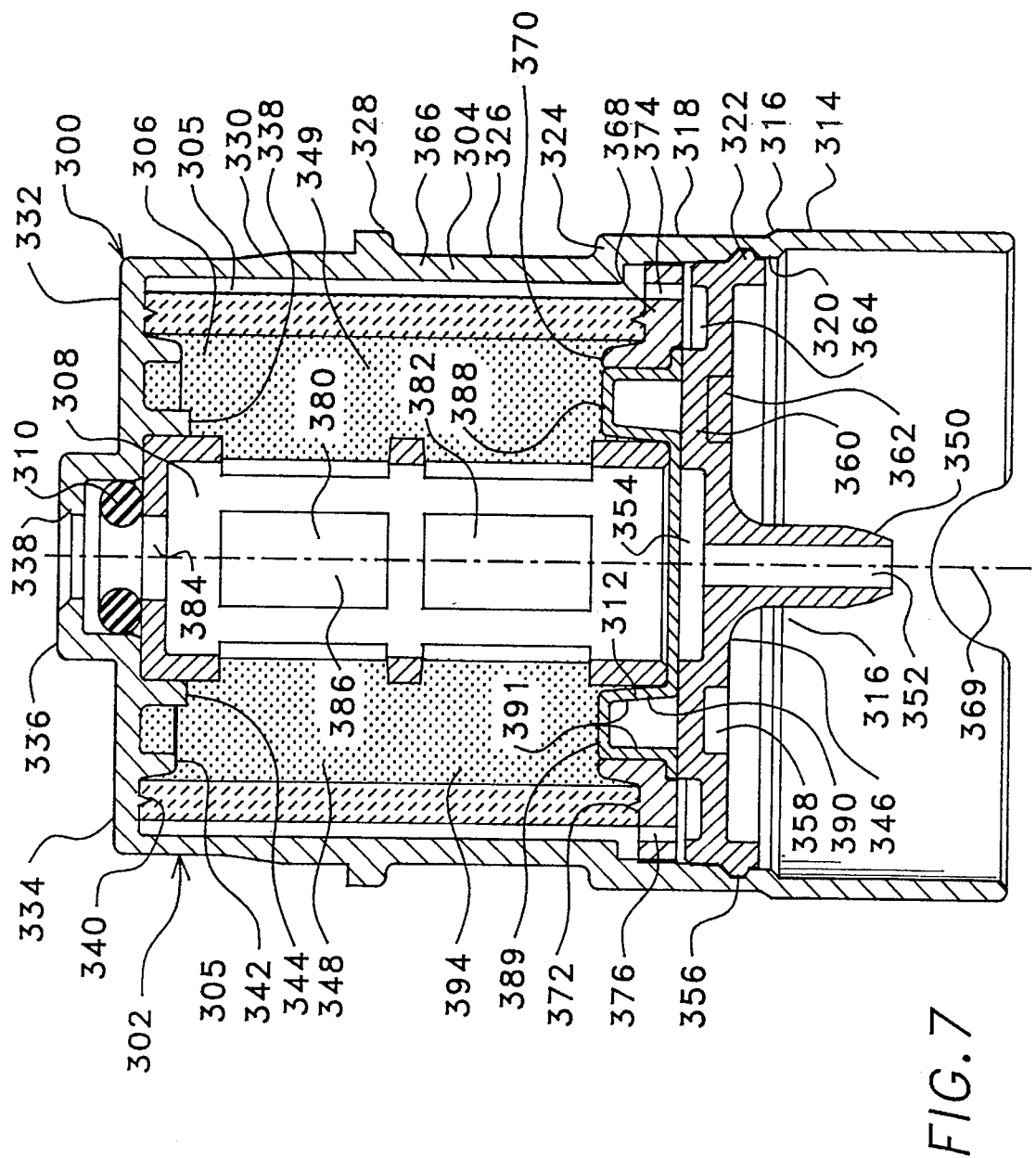
FIG. 7 depicts a third embodiment of the present invention including a biocide cartridge having the treating agent packed within a tubular column.

FIG. 7 depicts a third embodiment of the invention, third cartridge 300, which incorporates a flow-governing system including a radial-flow biocide bed. The major components of cartridge 300 include marginal wall structure 302, flow-governing assembly 304 including critical plenum 305, biocide bed 306, outlet screen element 308, O-ring 310, and bottom seal element 312.

Marginal wall structure 302 is formed of a synthetic resin, and includes lowermost tubular shell 314, which is ultrasonically welded at line 316 to vertical wall section 318 of a slightly reduced diameter. Wall section 318 includes an interior face 320 having an interior circumferential notch 322 just above weld line 318. Wall section 318 rises to first shoulder 324, and continues rising along reduced-diameter wall portion 326. Portion 326 includes exterior shoulder nib 328, which is followed upwardly by circumferential wall thickness taper 330 to meet with an integrally formed top wall 332.

Top wall 332 includes a disk-shaped planar outer ring 334, and a central cylindrical outlet protrusion having a central aperture forming beveled central outlet 338. Top 332 includes a lowermost surface forming circular knife-edge protrusion 340, a first radially spaced retaining cylinder 342, and a second radially spaced retaining cylinder 344.

Bottom wall 346 is opposed from top wall 332 across interior cavity 348. Wall 346 includes elongated tubular male inlet protrusion 350 having a central inlet opening 352 capable of establishing fluidic communication between water outside cartridge 300 and central inlet space 354. Wall 346 has an outer radial circumference 356 that compressively interengages with notch 322 to form a watertight seal. Even more preferably, wall 346 and notch 322 are coupled by means of an ultrasonic weld at circumference 356. Wall 346 also includes baffle 358, which is a series of alternating raised nibs having equally spaced radial square edges, e.g., square nib 360, separated by intermediate troughs, e.g, trough 362, communicating inlet space 354 with outer radial chamber 364.

Flow governing assembly 304 includes critical plenum 305, tubular fibrous labyrinth depth filter element 366 and filter ring 368. Element 366 preferably has openings therethrough of dimensions that are sufficient to remove particles having mean diameters as small as 0.3 microns for the removal of non-viral pathogens. Again, the effective openings may be enlarged, preferably, up to about 5 microns, to suit the intended environment of use.

As is best depicted in FIG. 7, critical plenum 305 is formed as an annulus between the impermeable outer vertical wall portion 326 and the interior tubular filter element 366. The dimensions of plenum 305 are preferably defined by equation (1) above. In most held-held water filtration devices, the change in tubular diameter between the radially inward face of wall portion 326 and the radially outward face of filter element 366 will, as before according to equation (1), typically range from about 0.25 to about 2.0 millimeters for flow speeds of about 1 liter per minute where filter element 366 has a diameter ranging from about 25 millimeters to about 40 millimeters and a length ranging from about 12 millimeters to about 50 millimeters.

Filter ring 368 provides an innermost, circumferential, upwardly raised filter retaining cylinder 370, and an upper circumferential knife-edge feature 372. The respective knife-edge features 340 and 372 at the upper and lower extremities of filter element 366 are pressed into element 366 to produce complimentary circular grooves in element 366 and there form a water-tight seal. These respective grooves compressively engage knife-edge features 340 and 372 under bias from lower wall 346. Ring 368 is provided with a plurality of through-extending cylindrical ports, e.g., ports 374 and 376, communicating chamber 364 with radial critical plenum 305. It should be noted that filter element 366 divides cavity 348 into an inlet side proximal to plenum 305 and an outlet side remote from plenum 305.

Biocide bed 306 is preferably a halogenated ionic exchange resin as described above. In the embodiment of cartridge 300, however, bed 306 is packed to completely fill the volume of cavity 348, i.e., space 349 intermediate filter element 366 and screen element 308. Bed 306 coextends with a central axis of symmetry, and is configured to permit radial flow across bed 306 in a direction perpendicular to the central axis. The increase in available flow path surface area normal to the radial flow path across elongated bed 306 provides for a correspondingly reduced flow speed, which reduces channeling and decreases flow resistance.

Tubular bed-retaining element 308 includes a plurality of rectangular ducts, e.g., ducts 380 and 382, establishing fluidic communication between bed 306 and uppermost screen outlet hole 384. Permeable wall 386, which is preferably formed of a monofilament polyester screen or fibrous depth filter, fills the complete interior of element 308, and is bonded to the interior surfaces thereof, for purposes of retaining bed 306 within cavity 348. Permeable wall 386 preferably has pore size openings ranging from about 10 microns to about 1000 microns depending upon the particle size distribution of treating agent bed 306. Element 308 is prevented from upper lateral movement by second radial cylinder 344.

O-ring 310 is preferably formed of an elastomer, and is most preferably neoprene rubber.

Bottom seal element 312 is formed of a low-elastic modulus plastic having an outer radial margin formed with a cylindrical channel 388 having a U-shaped crossection presenting a flexible central bight 389 connecting opposed legs 391. Channel 388 seats compressively against bed-retaining element 308 and the filter ring 368 to seal the biocidal material within cavity 348. Bottom wall 346 is a very high stiffness spring, preferably made of plastic, that compressively engages bottom seal element 312 to prevent bed-retaining element 308 from creeping out of a press fit seal between bed-retaining element 308 and top 332, thereby maintaining a long term pathogen-tight seal.

Figure 8:
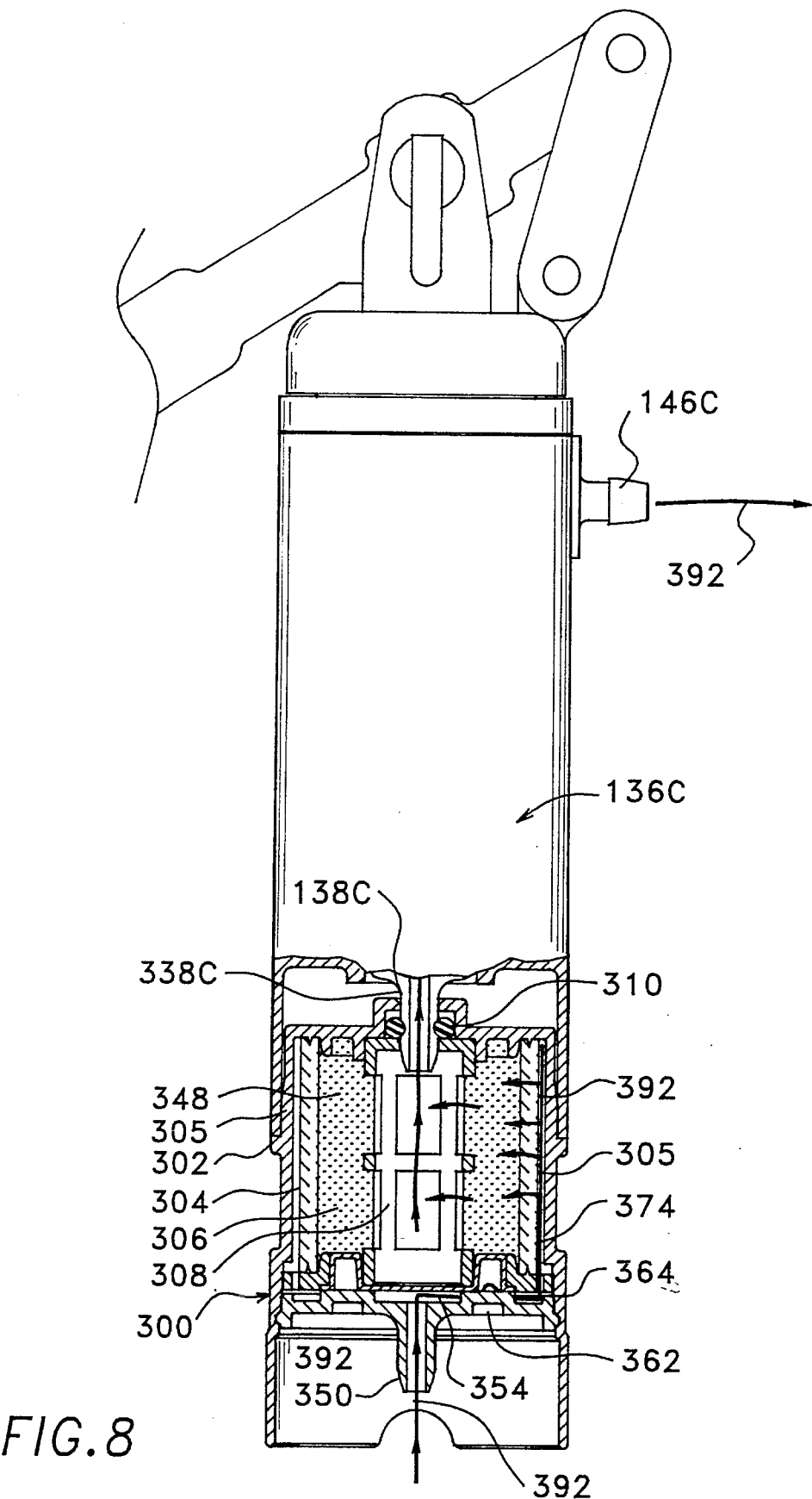
FIG. 8 depicts the FIG. 7 embodiment attached to a hand-held filter pump.

FIG. 8 depicts the cartridge of FIG. 7 connected to a hand-held pump as described above. In FIG. 8, identical elements with respect to FIG. 5 have retained like numbering followed by the addition of a "C" postscript. Flow pathway 392 travels across cavity 348 between an upstream position at inlet 350 and a downstream position at outlet 338. More specifically, pathway 392 enters cartridge 300 at inlet 350, travels to inlet space 354 and radially outward across baffle trough 362 to chamber 364. Thereafter, pathway 392 turns 90° to travel upwardly through the plurality of radially disposed ports like port 374, into critical plenum 305, reverses 90° to travel inwardly across mechanical filter element 366, across biocide bed 306, and turns 90° to travel upwardly through outlet 338 into pump 136C. The purified water exits at pump outlet 146C.

It should be observed that the portion of pathway 392 crossing biocide bed 306 travels at a substantially uniform speed across a right angle relative to line of symmetry 369 (see FIG. 7) drawn between inlet 350 and outlet 338. This abrupt 90° change in flow direction within bed-retaining element 308 serves to fully mix the halogenated water therein, which may dissolve differing amounts of halogen in bed 306 depending upon the height at which the water crosses bed 306. The sizing of plenum 305 according to equation (1) serves to provide a substantially uniform volumetric flow speed across the entire surface of filter element 366. This uniform fluid flow speed is especially advantageous in the cartridge 300 embodiment because high flow regions proximal to filter element 366 are avoided, as is the corresponding potential for high-flow channeling through biocide bed 306.

In use, cartridge 300 performs in much the same way as does cartridge 20, but cartridge 300 differs from cartridge 20 in that cartridge 300 substitutes a packed columnar biocide bed 306 for turbulatable bed 32. Columnar bed 306 presents an optimum increased external surface area 394 (see FIG. 7) for flowing water with a minimum pressure drop at a reduced uniform speed across bed 306. This reduced speed concomitantly reduces the incidence of channeling across bed 306 that may occur at a given flow speed, and also increases the transit time of water traveling across bed 306 to increase halogen content in the water and permit the halogen more time to destroy viral and bacterial pathogens, and especially viral pathogens.

Cartridge 300 is preferably manufactured by sealing a radial-flow tubular column of wet or slurried granular biocide bed 306 within cartridge 300. The manufacturing method includes forming marginal wall structure 302 having an interior compartment formed of shell 314, section 318, portion 326 and top wall 332, with a temporarily open end in place of bottom wall 346. Top wall 332 is formed to include an interior sealing structure having the rim-like knife-edge protrusion 340 circumscribing the central core portion formed by second radially spaced retaining cylinder 344. A pair of concentric tubular bed-retaining elements are provided, i.e., screen element 308 and filter element 366, which are separated by the annulus formed as space 349. The radially inward element, i.e., screen element 308, has a first end proximal to screen outlet hole 384 of dimensions complimentary to the core portion or cylinder 344, and a second end proximal to inlet space 354 which is opposed from the first end. The radially outward filter element 366 has a primary end proximal to protrusion 340 for contact therewith and a secondary end remote from the primary end. The first end of screen element 308 is pressed into sealing engagement within cylinder 344, and the primary end of filter element 366 is pressed into sealing engagement with the protrusion 340. The radially outward filter element 366 is retained and sealed against fluid leakage at both ends by bonding filter ring 368 to wall structure 302 in a manner permitting ring 368 to compressively engage the secondary end. The annular space 349 is filled by pouring the slurried material for biocide bed 306 through the opening between filter element 366 and screen element 308. Cylindrical channel 388 is positioned to seal this opening. Finally, bottom wall 346 is attached to wall structure 302 as depicted in FIG. 7 to contact channel 388 and bias the same into a pathogen-tight sealing engagement with screen element 308 and filter ring 368. The dual compression of channel 388 between ring 368 and screen element 308 makes this special seal particularly resistant to the seal-degrading effects of plastic creepage.

Figure 9:
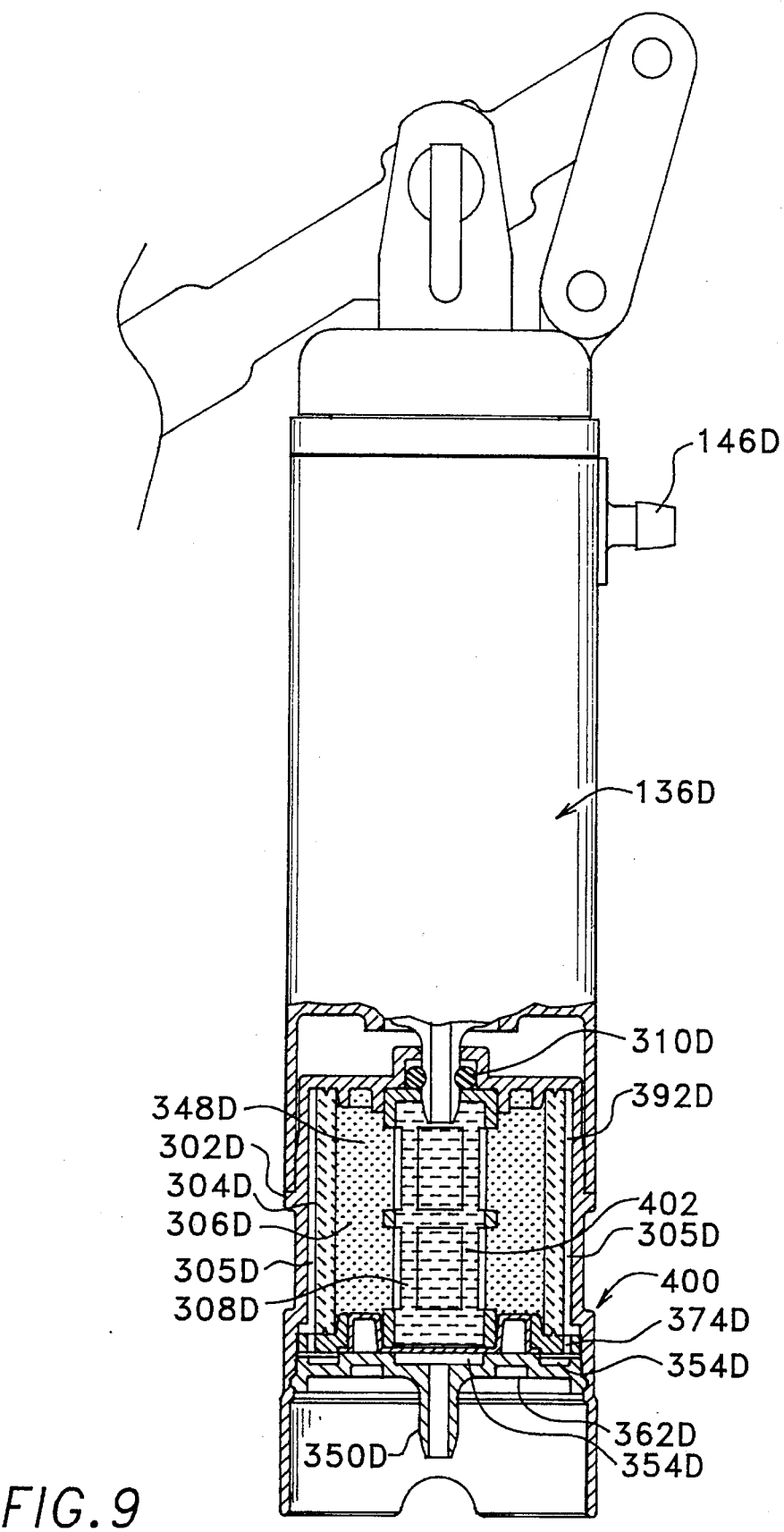
FIG. 9 depicts a fourth embodiment of the present invention, like that of the FIG. 7 embodiment, but additionally having a positively charged matrix just prior to the cartridge outlet.

FIG. 9 depicts a fourth embodiment of the present invention, cartridge 400, wherein identical elements with respect to FIG. 8 have been provided with like numbering followed by the addition of a "D" postscript. In fact, cartridge 400 is identical to cartridge 300, except that cartridge 400 has been additionally provided with a positively-charged matrix 402 covering bed-retaining element 308D. Matrix 402 is formed as a fiberglass mesh or fiberglass wool having effective openings preferably ranging between 10 and 500 microns, and a quaternary amine coating.

Cartridge 400 functions in the same manner as does cartridge 300, except the positively charged matrix serves to retain viral particles for increase reaction time exposure to the halogenated water passing from bed 306D.

Figure 12:
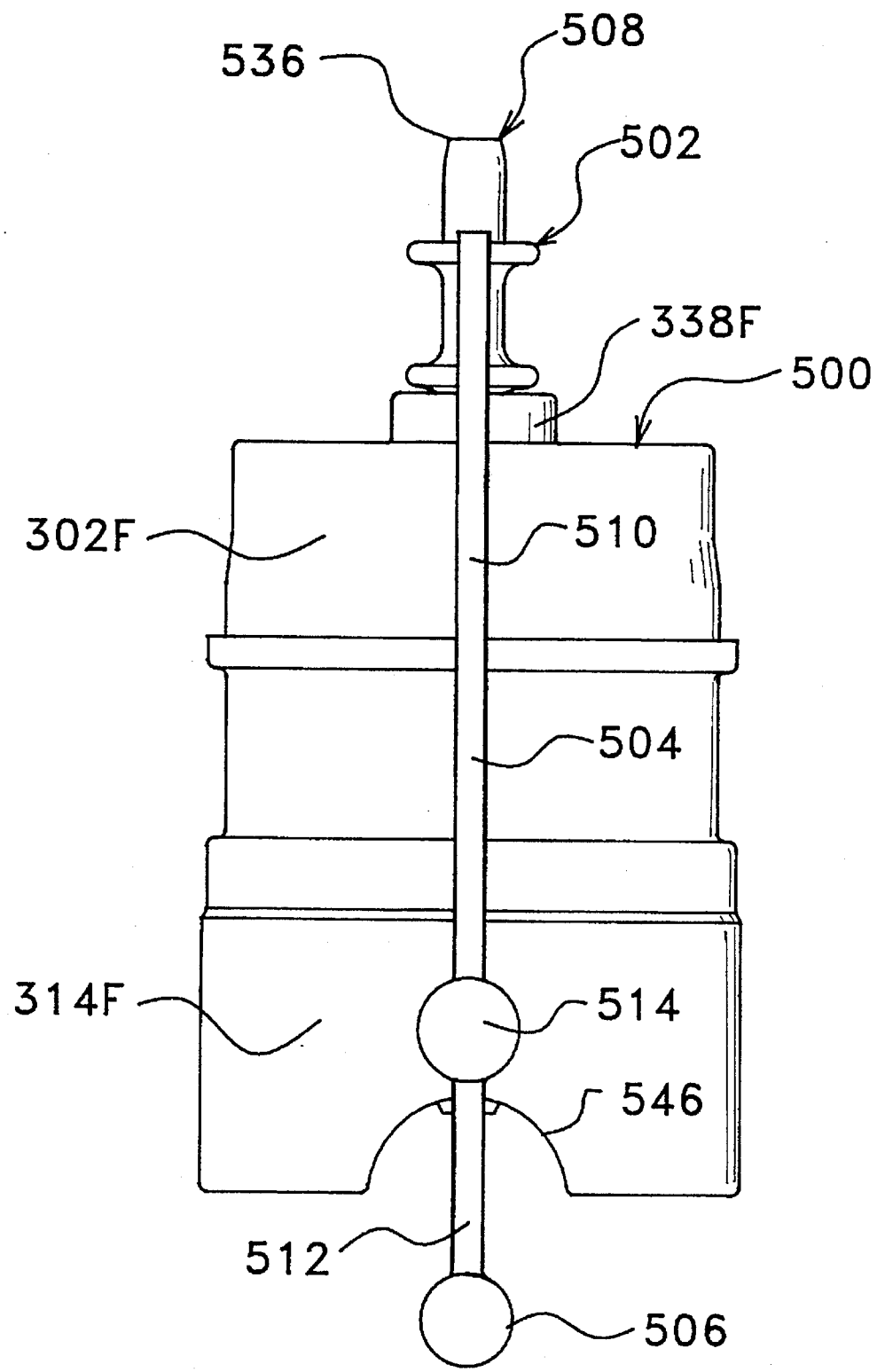
FIG. 12 depicts an elevational view of the FIG. 10 cartridge having the strap attached in a backflushing configuration.

FIGS. 10, 11, and 12 depict a fifth and final embodiment of the present invention, cartridge 500, wherein identical elements with respect to FIG. 7 have been provided with like numbering followed by the addition of an "F" postscript. In fact, the embodiment of FIGS. 10–12 is identical to the FIG. 7 embodiment, except fop the addition of strap 502 for retaining water within the filter in storage. The preferred biocide material, i.e., halogenated ionic exchange resins last longer if they are stored wet. Furthermore, in the event that these resins dry out, several hours of soaking may be required before the resins will again function to release effective amounts of biocide into the pathogen-contaminated water. FIGS. 10–12 depict strap 502 in an exemplary manner as it appears when attached to a biocide cartridge that is identical to cartridge 300 of FIG. 7 however, those skilled in the art will understand that strap 502 can function in exactly the same manner when strap 502 is coupled with any of cartridges 20, 200, 300, or 400.

FIG. 10 is a midsectional view that depicts an integrally formed flexible elastomeric strap 502 having an intermediate section 504 connecting opposed cap end 506 and backflush/plug attachment 508. Intermediate section 506 is formed of elongated strap members 510 and 512, which are integrally formed with a central disk member 514 having a central clip element 516. Clip element 516 has a cylindrical shaft 518 and a flexible conical head 520 of greater maximum diameter than shaft 518 at a position remote from disk member 514. Shaft 518 presents a length sufficient to extend through hole 522 within wall 314F to there permit retention of strap 502 by head 520.

Cap end 506 has a flexible tubular wall 524 connected to closed end 526 and presenting open end 528. Tubular wall 524 has a diameter smaller than that of inlet 350F, but sufficient to permit flexible expansion of wall 524 as it passes over inlet 350F for frictional engagement therewith and sealing of water inside cavity 348F, as depicted in FIG. 11.

Attachment 508 includes through tubular member 530 having a through tubular wall 532 and dead-end, outlet-sealing plug 534 rising outwardly from wall 532 at a position intermediate first and second opposed open ends 536 and 538 along a line (not depicted) that may be drawn substantially parallel with a radius of wall 532. Lips 540 and 542 prevent overinsertion of member 530 into corresponding receiving openings such as O-ring 310F. As depicted in FIG. 10, tubular wall 530 is operably attached for backflushing of cartridge 500 that may be accomplished by coupling connector end 536 with a water source (not depicted), e.g., by insertion of end 536 into a flexible hose, while opposed end 538 is received within O-ring 310F. As depicted in FIG. 11, plug 534 is rotated about 90° with respect to the FIG. 10 orientation for receipt within outlet 338F for sealing of water within cavity 348F.

Those skilled in the art will understand that the preferred embodiments, as hereinabove described, may be subjected to obvious modifications without departing from the true scope and spirit of the invention. Accordingly, the inventors hereby state their intention to rely upon the Doctrine of Equivalents, in order to protect their full rights in the invention.

We claim:

1. A filtration cartridge for use in purifying water, comprising:

a wall defining an interior cavity having an upstream inlet and a downstream outlet;

a filtration bed positioned within said cavity and including a biocide bed providing means for purifying water flowing within said cavity between said upstream inlet and said downstream outlet by introducing a halogen moiety to said water in an effective amount for treating said water against bacteria and viruses;

a positively charged mesh positioned within said cavity downstream of said biocide bed; and means within said cavity for conducting water through said biocide bed to said positively charged mesh.

2. The filtration cartridge as set forth in claim 1, said positively charged mesh including a fiberglass wool coated with a positively charged substance.

3. The filtration cartridge as set forth in claim 1, said positively charged mesh including a polyester screen.

4. The filtration cartridge as set forth in claim 3, said polyester screen being coated with a quaternary amine.

5. The filtration cartridge as set forth in claim 1, said mesh having openings of an effective diameter ranging from about 10 microns to about 500 microns.

6. The cartridge as set forth in claim 1 wherein said filtration cartridge includes a plurality of concentric walls disposed within the biocide bed, said plurality of concentric walls providing means for subdividing said cavity to elongate a continuous flowpath through said biocide bed.

7. The cartridge as set forth in claim 6 wherein said biocide bed is a granular turbidifiable biocide bed partially filling said cavity within said flowpath.

8. The filtration cartridge as set forth in claim 1, wherein said filtration cartridge includes a tubular microfilter concentric to and surrounding said biocide bed, said tubular microfilter having an outer cylindrical face and an inner cylindrical face, said tubular microfilter defining means for removing substantially all protozoa from said water.

9. The cartridge as set forth in claim 8 wherein said tubular microfilter is a fibrous labrynth depth filter.

10. The cartridge as set forth in claim 8 including said outer cylindrical face of said tubular microfilter positioned within said cavity a distance apart from said cavity wall to define a plenum intermediate said cavity wall and said outer cylindrical face, said plenum having a change in diameter between said cavity wall and said outer cylindrical face defined by an equation $$C1 = |(0.3 * L_f * Q)/(v * \Delta D * D_f)|, \text{ wherein}$$

C1 is an absolute-value dimensionless constant ranging from about 500 to about 1500, v is a fluid kinematic viscosity, $L_f$ is an axial length of said tubular microfilter, Q is an average fluid flow rate through said plenum, $\Delta D$ is $D_f - D$, $D_f$ is a diameter of said tubular microfilter at said outer cylindrical face, and D is a plenum diameter at said cavity wall opposed from said tubular microfilter and proximal to said chamber.

11. The filtration cartridge as set forth in claim 8 wherein said biocide bed is an annular ion exchange resin bed concentric to said tubular microfilter and surrounded by said inner cylindrical face.

12. The filtration cartridge as set forth in claim 11 wherein said filtration cartridge includes a central bore surrounded by said annular ion exchange resin bed, and said positively charged mesh includes a screen element disposed within said bore and concentric to said annular ion exchange resin bed to provide a substantially uniform distance across said biocide bed from said inner cylindrical face to said screen element.

* * * * *